(12) United States Patent
Fukushima et al.

(10) Patent No.: US 8,735,473 B2
(45) Date of Patent: May 27, 2014

(54) FLAME-RETARDANT THERMOPLASTIC RESIN COMPOSITION

(75) Inventors: Mitsuru Fukushima, Saitama (JP);
Tomoyuki Hatanaka, Saitama (JP);
Akihiro Yamaki, Saitama (JP);
Takayoshi Kaneda, Saitama (JP);
Fumiaki Otsubo, Saitama (JP)

(73) Assignee: Adeka Corporation, Tokyo (JP)

( * ) Notice: Subject to any disclaimer, the term of this patent is extended or adjusted under 35 U.S.C. 154(b) by 177 days.

(21) Appl. No.: 13/056,781
(22) PCT Filed: Jul. 14, 2009
(86) PCT No.: PCT/JP2009/003293
§ 371 (c)(1),
(2), (4) Date: Jan. 31, 2011
(87) PCT Pub. No.: WO2010/013400
PCT Pub. Date: Feb. 4, 2010

(65) Prior Publication Data
US 2011/0130491 A1  Jun. 2, 2011

(30) Foreign Application Priority Data
Aug. 1, 2008 (JP) ................. 2008-200049

(51) Int. Cl.
C08K 5/34 (2006.01)
C08K 5/3442 (2006.01)
C08K 5/3492 (2006.01)
C08K 5/521 (2006.01)
C08K 5/523 (2006.01)

(52) U.S. Cl.
USPC ........... 524/100; 524/140; 524/141; 524/143; 524/144; 524/432

(58) Field of Classification Search
USPC .................. 524/100, 140, 432, 141, 142, 144
See application file for complete search history.

(56) References Cited

U.S. PATENT DOCUMENTS

2003/0232933 A1   12/2003   Lagneaux et al.

FOREIGN PATENT DOCUMENTS

| EP | 1 516 907 | 3/2005 |
|---|---|---|
| JP | 2000178559 A | 6/2000 |
| JP | 2001049053 A | 2/2001 |
| JP | 2001055515 A | 2/2001 |
| JP | 2001261855 A | 9/2001 |
| JP | 2004137316 A | 5/2004 |

OTHER PUBLICATIONS

Asahi Denka Kogyo KK, "Fireproof sealing material," Patent Abstracts of Japan, Publication Date: May 13, 2004; English Abstract of JP-2004 137316.

(Continued)

*Primary Examiner* — Kriellion Sanders
(74) *Attorney, Agent, or Firm* — Millen, White, Zelano & Branigan, P.C.

(57) ABSTRACT

The flame-retardant thermoplastic resin, composition comprised of the following Components (C), (D) and (E) with the thermoplastic resin composition having a thermoplastic polyurethane elastomer of the Component (A) and an ethylene polymer and/or an ethylene copolymer of the Component (B) as the main components;
Component (C): a (poly) phosphate compound represented by the following general formula (1).

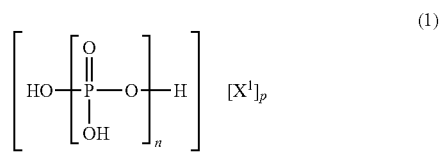

(1)

n in the formula (1) represents a number of 1-100; $X^1$ is an ammonia; or a triazine derivative, represented by the following general formula (2); p is a number satisfying a relation of $0 < p \leq n+2$;

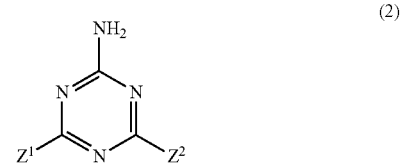

(2)

Component (D): a (poly) phosphate compound represented by the following general formula (3).

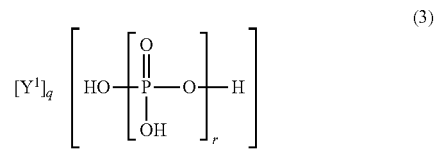

(3)

r in the formula (3) represents a number of 1~100; $Y^1$ is a diamine containing $[R^1R^2N(CH_2)_mNR^3R^4]$, piperazine or a diamine containing a piperazine ring; $R^1, R^2, R^3$ and $R^4$ are each a hydrogen atom, or a straight chain or branched alkyl group having 1~5. carbon atoms; m is an integer of 1~10; q is a number satisfying a relation of $0 < q \leq r+2$;
Component (E): phosphoric acid ester compound represented by the following general formula (4).

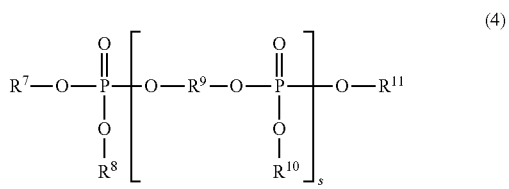

(4)

$R^7, R^8, R^{10}$ and $R^{11}$ in the formula (4) represent an alkyl group having 1~10 carbon atoms, or an aromatic group represented by the following general, formula (5); $R^9$ represents a bivalent aromatic group represented by the following general formula (6) or (7); s is a number of 0~30.

8 Claims, 2 Drawing Sheets

(56) References Cited

OTHER PUBLICATIONS

Dainippon Ink & Chem Inc., "Resin composition and its molded product," Patent Abstract of Japan, Publication Date: Feb. 20, 2001; English Abstract of JP-2001 049053.

Sumitomo Bakelite Co Ltd., "Fire retardant sheet," Patent Abstracts of Japan, Publication Date: Sep. 26, 2001; English Abstract of JP-2001 261855.

Supplementary European Search Report for EP09 80 2650 dated Jul. 28, 2011.

Espacenet Database: "English abstract—Resin Composition and its Molded Product." JP2001049053A, Applicant: Dainippon Ink and Chemicals, Inc. Feb. 20, 2001.

Espacenet Database: "English abstract—Fireproof Sealing Material." JP2004137316A, Applicant: Asahi Denka Co., Ltd., May 13, 2004.

Espacenet Database: "English abstract—Fire Retardant Sheet." JP2001261855A, Applicant: Sumitomo Bakelite Co. Ltd., Sep. 26, 2001.

Espacenet Database: "English abstract—Flame Retardant for Mesh Sheet Set Up at Building Construction Site and Flameproof Mesh Sheet Set Up at Building Construction Site." JP2000178559A, Applicant: Kyowa Kabushiki Kaisha, Jun. 27, 2000.

Espacenet Database: "English abstract—Flame Retardant Tablet, Flame Retardation with Same, Flame-Retardant Resin Composition Containing Same, and Molded Product of the Composition." JP2001055515A, Applicant: Tosoh Corp., Feb. 27, 2001.

World IP Organization. "International Search Report." PCT/JP2009/003293, Applicant: Adeka Corporation, ISA: Japanese Patent Office, Mailed: Oct. 27, 2009.

FLAME-RETARDANT THERMOPLASTIC RESIN COMPOSITION

TECHNICAL FIELD

The present invention relates to a thermoplastic resin composition having thermoplastic polyurethane elastomer and ethylene (co)polymer as the main components, in particular relates to a thermoplastic resin composition having excellent compatibility, workability and flame retardancy thereof and relates to electric wires or cables using the same.

BACKGROUND OF THE ART

A thermoplastic polyurethane elastomer has been conventionally used in various fields such as hoses, belts, electric wires, cables, pipes, soles and various types of molded articles, taking advantage of its excellent mechanical strength and wear resistance. Particularly, a resin which is improved in molding ability and water resistance obtained by alloying an ethylene copolymer such as an ethylene-vinyl acetate copolymer (EVA) and a thermoplastic polyurethane elastomer (Patent document 1) is used. However, the thermoplastic polyurethane elastomer, which consists of movable long chain parts called a soft segment and extremely high crystalline parts called a hard segment, has poor compatibility with other resins. Therefore, it has a disadvantage that the compatibility with ethylene polymers and ethylene copolymers is insufficient.

Furthermore, the thermoplastic resin composition having the thermoplastic polyurethane elastomer and the ethylene copolymer as the main components has a disadvantage of being poor in flame retardancy. This disadvantage is improved by adding a metallic hydrate such as magnesium hydrate (Patent document 2). However, the thermoplastic resin composition having the thermoplastic polyurethane elastomer and the ethylene (co)polymer as the main components is noncompatible. or poorly compatible on its own. Therefore, the compatibility gets worse and worse by using a large amount of inorganic substances such as a metallic hydrate, and also workability, surface properties of resin and physical properties or the like deteriorate and the flame retardancy thereof was not sufficient.

In addition, resin compositions wherein compounds containing nitrogen and/or phosphor such as melamine phosphate, melamine polyphosphate and condensed phosphate ester were added to the thermoplastic polyurethane elastomer to impart flame retardancy are known (Patent document 3). However, in this case, the flame-retardant mechanism is not the one wherein the flame retardancy is provided by forming a surface intumescent layer so as to suppress a diffusion of the decomposition products and heat transmission produced when burned. Moreover, there is no description in the specification suggesting that the compatibility of the above resin composition was improved.

On the other hand, an invention wherein a specific phosphate compound and a phosphate ester flame retardant were added to the thermoplastic polyurethane elastomers in combination was disclosed (Patent document 4). However, this invention concerns a fire-retardant sealing agent which is completely different in use from electric wires and cables or the like. Moreover, there is no description suggesting that the compatibility and flame retardancy of the resin composition having the thermoplastic polyurethane elastomer and the ethylene copolymer as the main components were improved.

PRIOR ART DOCUMENT

Patent Document

[Patent document 1] Japanese Unexamined Patent Publication Tokkaihei 3-97750
[Patent document 2] Japanese Unexamined Patent Publication Tokkai 2004-51903
[Patent document 3] Japanese Unexamined .Patent Publication Tokkai 2001-49053
[Patent document 4] Japanese Unexamined Patent Publication Tokkai 2004-137316

It is well known that, as coating materials for devices of electric wires used for electric·electronic devices, electric internal and external wiring of transmission devices, electric insulated wires, cables, cab tire cables, optical cords and optical fiber cables or the like, chlorine-containing flame-retardant resin or resin compositions having ethylene copolymers as the main component and containing so-called halogen flame retardant with bromine atoms or chlorine atoms within a molecule are used.

However, when the above flame-retardant resins and resins containing flame retardants are thrown away without an appropriate treatment, not only heavy metal stabilizers compounded in the coating materials dissolve out, but also corrosive gas is emitted when burned, which were problems. In addition, in the case of using antimony trioxide in order to make chlorine-containing resin further flame-retardant, since the antimony trioxide contains lead and arsenic as impurities which come from raw ore, these poisonous components are contained together, which is also a problem. Therefore, recently it has been required to develop techniques to coat electric wires with a non-halogen flame-retardant material containing no halogen wherein harmful heavy metal can riot dissolve out and there is no possibility of generation of halogen gas.

The non-halogen flame-retardant material expresses flame retardancy by compounding a flame retardant which does not contain halogen in a resin. Metallic hydrates such as magnesium hydrate and aluminium hydrate are used as a flame retardant. However, since the flame retardancy of these flame retardants is not sufficient, it is necessary to compound a large amount. of them when used as a flame retardant. In cases where a large amount of these are forced to be used, since not only the compatibility and dispersibility of a flame retardant against resins become problems, but also the workability tends to be poor, there was a defect that a required physical properties for electric wires and cables were insufficient.

Furthermore, in case of compounding a flame retardant with noncompatible resin composition which has a thermoplastic polyurethane elastomer and an ethylene copolymer as the main components, defect in workability of the obtained resin composition when electric wires or the like are manufactured, and dispersion defect of each component compounded into the said composition were problems. Therefore, an attempt to improve the above workability using a lubricant together has been made in the past. However, when a lubricant is used together, the flame retardancy decreases, which is a disadvantage. For this reason, it has been required to develop the flame-retardant resin composition, which is noncompatible as described above, having excellent workability and dispersibility, and has no damage in the flame retardancy.

SUMMARY OF THE INVENTION

Problems to be Solved by the Invention

Therefore, the first object of the present invention is to provide a thermoplastic resin composition having a thermoplastic polyurethane elastomer and ethylene copolymer as the main components and excellent in compatibility, dispersibility, workability and flame retardancy.

The second object of the present invention is to provide electric wires or cables excellent in flame retardancy, surface properties and physical properties.

Means to Solve the Problems

The inventors, of the present invention have, studied extensively in order to achieve the above objects. As a result of this, they found that by using two kinds of specific (poly) phosphate compounds as a flame retardant, and by further using phosphoric acid ester compounds in combination as a compatibility·dispersibility improving agent which improves the compatibility and dispersibility of other additional components in the compositions, the considerably excellent results are obtained, and the present invention was completed.

Namely, the present inventions are a flame-retardant thermoplastic resin composition characterized in that the following components (C), (D) and (E) are compounded with a thermoplastic resin composition having the following components (A) and (B) as the main components, and electric wires and cables using the same.

Component (A): a thermoplastic polyurethane elastomer.

Component (B): an ethylene polymer and/or an ethylene copolymer.

Component (C): a (poly) phosphate compound represented by the following general formula (1).

Component (D): a (poly) phosphate compound represented by the following general formula (3).

Component (E): a phosphoric acid ester compound represented by the following general formula (4).

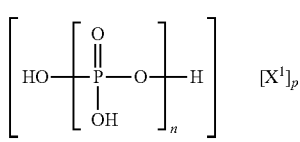
(1)

n in the formula (1) represents a number of 1~100, $X^1$ is an ammonia or a triazine derivative represented by the following general formula (2) and p is a number-satisfying a relation of $0 < p \leq n+2$.

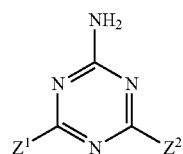
(2)

$Z^1$ and $Z^2$ in the formula (2) may be identical or different and are groups selected from groups of a —$NR^5R^6$ group [herein, $R^5$ and $R^6$ are each a hydrogen atom, a straight chain or branched alkyl group having 1~6 carbon atoms, or a methylol group independently], a hydroxyl group, a mercapto group, a straight chain or branched alkyl group having 1~10 carbon atoms, a straight chain or branched alkoxy group having 1~10 carbon atoms, a phenyl group and a vinyl group.

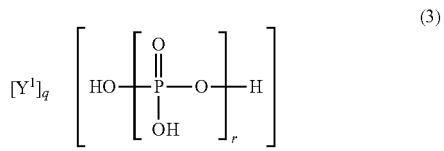
(3)

r in the formula (3) represents a number of 1~100, $Y^1$ is a diamine containing $[R^1R^2N (CH_2)_m NR^3R^4]$, piperazine of a diamine containing a piperazine ring. $R^1$, $R^2$, $R^3$ and $R^4$ are each a hydrogen atom, or a straight chain or branched alkyl group having 1~5 carbon atoms. $R^1$, $R^2$, $R^3$ and $R^4$ may be identical groups or different groups. m is an integer of 1~10, q is a number satisfying a relation of $0 < q \leq r+2$.

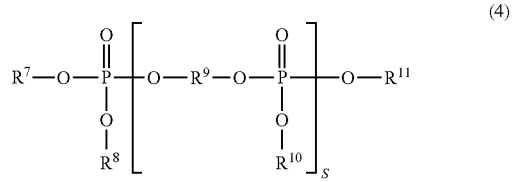
(4)

$R^7$, $R^8$, $R^{10}$ and $R^{11}$ in the formula (4) may be identical or different and represent an alkyl group having 1~10 carbon atoms, or an aromatic group represented by the following general formula (5). $R^9$ represents a bivalent aromatic group represented by the following general formula (6) or (7), s is a number of 0~30.

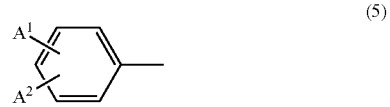
(5)

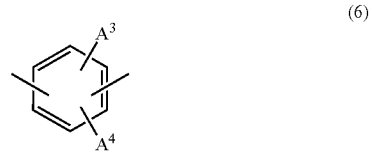
(6)

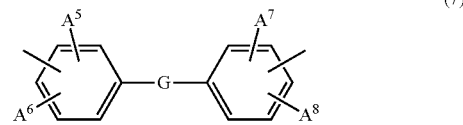
(7)

$A^1$ and $A^2$ in the above general formulae represent each a hydrogen atom, a hydroxy group or an alkyl group having 1~10 carbon atoms independently. $A^3$, $A^4$, $A^5$, $A^6$, $A^7$ and $A^8$ represent each a hydrogen atom, an alkyl group having 1~4 carbon atoms, a cycloalkyl group, an aryl group, an alkoxy group, a nitro group, a halogen atom or a cyano group. G represents a direct, bond, a bivalent sulfur atom, a sulfonic group, an alkyl idene group having 1~5 carbon atoms or an alkylene group.

It is preferable that zinc oxide is further contained in the flame-retardant thermoplastic resin composition of the present invention as the component (F). It is preferable that melamine pyrophosphate, which is a compound corresponding to the aforementioned general formula (1) wherein n is 2, p is 2 and $X^1$ is melamine (wherein $Z^1$ and $Z^2$ in the above general formula (2) are —$NH_2$), is used as the above component (C).

In addition, it is preferable that piperazine polyphosphate, which is a compound corresponding to the aforementioned general formula (3) wherein q is 1, $Y^1$ is piperazine, is used as the above component (D) in the present invention, and in particular it is preferable to use piperazine pyrophosphate.

Furthermore, it is preferable to use an ethylene-vinyl acetate copolymer as an ethylene copolymer of the above component (B) used for the present invention.

Effect of the Invention

The flame-retardant thermoplastic resin composition of the present invention is a thermoplastic resin composition excellent in compatibility, dispersibility, workability and flame retardancy, which has a thermoplastic polyurethane elastomer and an ethylene copolymer as the main components. Therefore, it is suitable as a coating material for electric wires or cables.

MODES FOR CARRYING OUT THE INVENTION

Figure 1:
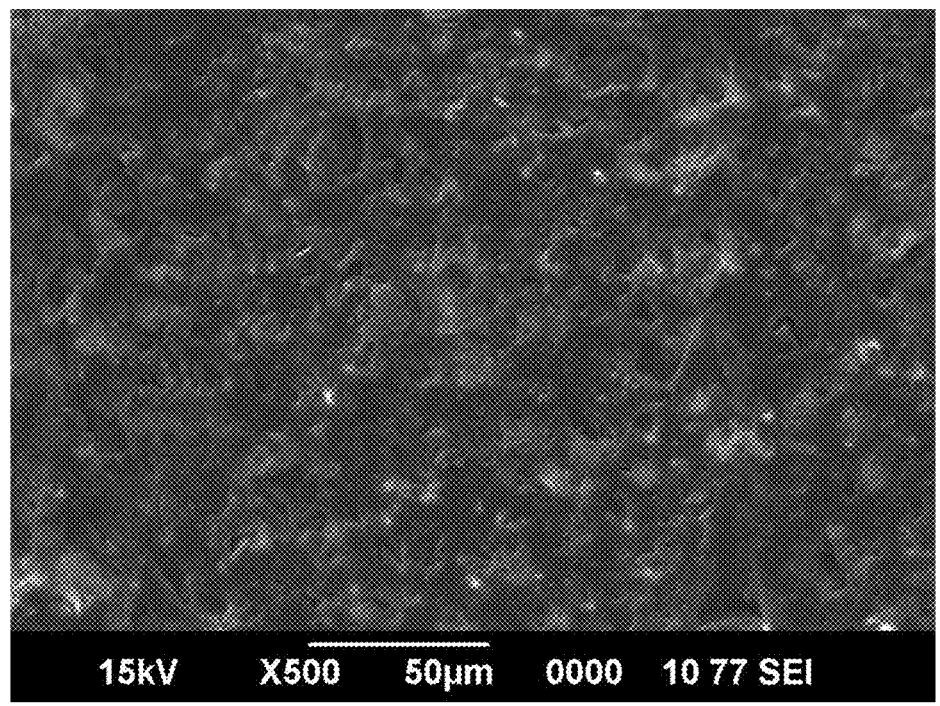
[FIG. 1]
A corresponding drawing to SEM picture obtained in the compatibility test, in Example 1.

Hereinafter, the flame-retardant thermoplastic resin composition of the present invention will now be explained in detail.

The thermoplastic polyurethane elastomer of the component (A) used for the thermoplastic resin composition of the present invention (TPU) is generally prepared using polyol, diisocyanate and a chain extender. Examples of polyol are polyester polyol, polyester ether polyol, polycarbonate polyol and polyether polyol.

Herein, examples of polyester polyol are polyester polyol obtained by esterification reaction of at least one kind of acid, selected from aliphatic dicarboxylic acids, such as succinic acid, adipic acid, sebacic acid and azelaic acid; aromatic dicarboxylic acids such as phthalic acid, terephthalic acid, isophthalic acid and naphthalenedicarboxylic acid; alicyclic dicarboxylic acids such as hexahydrophthalic acid, hexahydroterephthalic acid and hexahydroisophthalic acid; acid esters thereof and acid anhydrides thereof, with at least one kind of polyol selected from ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,3-octanediol and 1,9-nonanediol or the like; and polylactonediol or the like obtained by ring-opening polymerization of a lactone monomer such as ε-caprolactone.

Examples of the above polyester ether polyol are a compound obtained by esterification reaction of at least one kind of acid, selected from aliphatic dicarboxylic acids such as succinic acid, adipic acid, sebacic acid and azelaic acid; aromatic dicarboxylic acids such as phthalic acid, terephthalic acid, isophthalic acid and naphthalenedicarboxylic acid; alicyclic dicarboxylic acids such as hexahydrophthalic acid, hexahydroterephthalic acid and hexahydroisophthalic acid; acid esters thereof and acid anhydrides thereof, with at least one kind of glycol selected from glycols such as diethylene glycol and propylene oxide additives.

Furthermore, an example of the above polycarbonate polyol is polycarbonate polyol obtained by carrying out the reaction of one kind or two or more kinds of polyalcohols such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentylglycol, 1,8-octanediol, 1,9-nonanediol and diethylene glycol with diethylene carbonate, dimethyl carbonate or diethyl carbonate or the like.

Or a copolymer of polycaprolactonepolyol (PLC) and polyhexamethylene carbonate (PHL) is permissible.

Examples of the above polyether polyol are polyethylen glycol, polypropyleneglycol and polytetramethylene ether glycol or the like obtained by polymerizing respectively cyclic ethers such as ethylene oxide, propylene oxide and tetrahydrofuran, and copolyether thereof.

Examples of the above diisocyanate are tolylene diisocyanate (TDI), 4,4'-diphenyl methane, diisocyanate (MDI), 1,5-naphthylene diisocyanate (NDI), tolidine diisocyanate, 1,6-hexaxmethylene diisocyanate (HDI), isophorone diisocyanate (IPDI), xylylene diisocyanate (XDI), hydrogenerated XDI, triisocyanate, tetramethyl xylene diisocyanate (TMXDI), 1,6,11-undecane triisocyanate, 1,8-diisocyanate methyloctane, lysine ester triisocyanate, 1,3,6-hexamethylene triisocyanate, bicyclo heptane triisocyanate, dicyclohexylmethane. diisocyanate. (hydrogenated MDI; HMDI) or the like. It is preferable in the present invention to use 4,4'-diphenylmethane diisocyanate (MDI) and 1,6-hexamethylene diisocyanate (HDI) among these.

Low-molecular weight polyol is used as the above chain extender used for preparing the- thermoplastic polyurethane elastomer (TPU). Examples of this low-molecular weight polyol are aliphatic polyols such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentylglycol, 1,8-octanediol, 1,9-nonanediol, diethyleneglycol, 1,4-cyclohexanedimethanol and glycerine; and aromatic glycols such as 1,4-dimethylol benzene, bisphenol A and also ethylene oxide additive or propylene oxide additive of bisphenol A.

Specific examples of commercial products of ester (lactone) polyurethane copolymers are Elastollan C80A10 (manufactured by BASF Japan Ltd), Elastollan C80A50 (manufactured by BASF Japan Ltd), RESAMINE P-4000 SIRIES (manufactured by Dainichiseika Color & Chemicals Mfg. Co., Ltd. ) and RESAMINE P-4500 SIRIES(manufactured by Dainichiseika Color & Chemicals. Mfg. Co., Ltd.); specific examples of commercial products of ester (adipate) polyurethane copolymers are PANDEX T-5000V (manufactured by DIC Bayer Polymer Ltd.), PANDEX TR-3080 (manufactured by DIC Bayer Polymer Ltd.), RESAMINE P-1000 SIRIES (manufactured by Dainichiseika Color & Chemicals Mfg. Co., Ltd.) and RESAMINE, P-7000 SIRIES (manufactured by Dainichiseika. Color & Chemicals Mfg. Co., Ltd.); specific examples of commercial products of ether polyurethane copolymers are Elastollan 1180A50 (manufactured by BASF Japan Ltd), PANDEX T-8.180 (manufactured by DIC Bayer Polymer Ltd.), PANDEX T-8283(manufactured by DIC Bayer Polymer Ltd.), PANDEX T-1190 (manufactured by DIG Bayer Polymer Ltd.) and RESAMINE P-2000 SIRIES (manufactured by Dainichiseika Color & Chemicals Mfg. Co., Ltd.); a specific example of a commercial product of carbonate polyurethane copolymers is PAN- DEX T-7890 N(manufactured by DIC Bayer Polymer Ltd.); specific examples of commercial products of ether·ester polyurethane copolymers are Desmopan DesKU2-88586 (manufactured by DIC Bayer Polymer Ltd.) and RESAMINE P-800 SIRIES (manufactured by Dainichiseika Color &. Chemicals Mfg. Co., Ltd.).

These thermoplastic polyurethane elastomers (TPU) may be used alone or in combination.

It is preferable that the blending amount of the component (A) is 5~80 mass % relative to 100 mass % of the total of the components (A) and (B). 10~60 mass % is more preferable and 20~40 mass % is optimal. If the blending amount is less than 5 mass %, scratch resistance and mechanical strength which are characteristics of thermoplastic polyurethane elastomer, tend to be insufficient. If it is more than 80 mass %, compatibility, workability and surface properties of resin tend to be insufficient.

Next, an ethylene polymer and/or an ethylene copolymer, which are the component (B) in the thermoplastic resin composition of the present invention, are explained.

An ethylene polymer of the component (B) used in the present invention is a polymer having a structure wherein an ethylene is polymerized. Specific examples are high-density polyethylene (HDPE), low-density polyethylene (LDPE) and linear low-density polyethylene (LLDPE) or the like.

Examples of ethylene copolymers of the component (B) used for the present invention are ethylene copolymers such as ethylene-vinyl acetate copolymer, ethylene-ethyl acrylate copolymer, ethylene-methyl acrylate copolymer, ethylene-acrylic-acid-copolymer and ethylene-methacrylic acid copolymer. Ethylene-vinyl acetate-vinyl alcohol copolymer and ethylene-vinyl alcohol copolymer or the like, which are obtained by saponifying an ethylene-vinyl acetate copolymer using well-known methods, or by graft, copolymerizing ethylene, vinyl acetate and vinyl alcohol using well-known methods, can be used.

In the present invention, among an ethylene polymer and an ethylene copolymer used as the aforementioned component (B), it is preferable to use an ethylene-vinyl acetate copolymer from the viewpoint of dispersibility and the viewpoint of obtaining the remarkable improvement of oil resistance when it is mixed with a thermoplastic polyurethane elastomer. Furthermore, it is preferable that the content of vinyl acetate in the ethylene-vinyl acetate copolymer is 25~85 mass % (10~65 mol %), 30~85 mass % (12~65 mol %) is more preferable and 40~85 mass % (18~65 mol %) is optimal. Mechanical strength can be maintained by increasing the content of vinyl acetate more than 25 mass %, which makes it possible to maintain oil resistance and flame-retardant characteristics. In the present invention, these ethylen polymer and ethylene copolymer may be used alone, or two or more kinds of them may be used together.

As for an-ethylene-polymer and/or ah ethylene copolymer used in the present invention, molecular weight, density, softening-point, the proportion of insoluble matter to the solvent, the degree of stereoregularity, existence or nonexistence of catalyst residue, types and blending ratio of monomer of raw materials, types of polymerization catalyst or the like can be selected as appropriate.

It is preferable that the blending amount of the component (B) is 20~95 mass % relative to 100 mass % of the total of the components (A) and (B). 40~90 mass % is more preferable and 60~80 mass % is optimal. If the blending amount is less than 20 mass %, compatibility, workability and surface properties of resin tend to be unsatisfactory. If it is more than 95 mass %, not only scratch resistance and mechanical strength but also compatibility, workability and surface properties of resin tend to be unsatisfactory.

Next, the components (C) and (D) used for the flame-retardant thermoplastic resin composition of the present invention are explained.

The components (C) and (D) are flame-retardant components which form the surface intumescent layer to express the flame retardancy when the flame-retardant thermoplastic resin composition of the present invention is burned.

The (poly) phosphate compound, which is used as the component (C) in the flame-retardant thermoplastic resin composition of the present invention, represented by the following general formula (1) is a salt of phosphoric acid with ammonia or a triazine derivative.

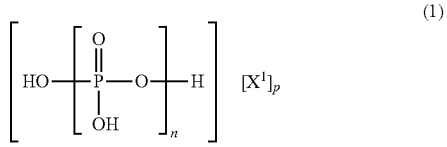

(1)

n in the formula (1) represents a number of 1~100, $X^1$ is an ammonia or a triazine derivative represented by the following general formula (2), p is a number satisfying a relation of $0<p \leq n+2$.

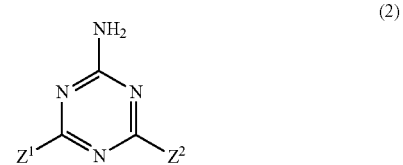

(2)

$Z^1$ and $Z^2$ in the formula (2) may be identical or different and are groups selected from groups of a $-NR^5R^6$ group [herein, $R^5$ and $R^6$ are each a hydrogen atom, a straight chain or branched alkyl group having 1~6 carbon atoms or a methylol group independently], a hydroxyl group, a mercapto group, a straight chain or branched alkyl group having 1~10 carbon atoms, a straight chain or branched alkoxy group having 1~10 carbon atoms, a phenyl group and a vinyl group.

Examples of a straight chain or branched alkyl group having 1~10 carbon atoms represented by $Z^1$ and $Z^2$ in the above general formula (2) are methyl, ethyl, propyl, isopropyl, butyl, secondary butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl and decyl. Examples of a straight chain or branched alkoxy group having 1~10 carbon atoms are groups derived from these alkyl groups.

Specific examples of the above triazine derivative are melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine and 2-amino-4,6-dimercapto-1,3,5-triazine or the like.

In the present invention, an example of (poly) phosphate compound preferably used as the component (C) is a salt of phosphoric acid and melamine, or an ammonium polyphosphate, compound. Examples of the preferably used salt of phosphoric acid and melamine are melamine orthophosphate, melamine pyrophosphate and melamine polyphosphate. In the present invention, it is preferable among these in particular to use melamine pyrophosphate which corresponds to a compound expressed by the aforementioned general formula (1) wherein n is 2, p is 2 and $X^1$ is melamine.

The above salt of the phosphoric acid and melamine can be obtained by the following methods. For example, melamine pyrophosphate can be obtained by adding hydrochloric acid to a mixture of sodium pyrophosphate and-melamine at the suitable reaction ratio for reacting and then by neutralizing with sodium hydroxide.

In addition, the aforementioned ammonium polyphosphate: compound is an ammonium polyphosphate itself or a compound whose main component is ammonium polyphosphate. Commercial products can be used as an ammonium polyphosphate itself. Examples of commercial products of the ammonium polyphosphate are Exolit-422 and Exolit-700 (Commercial names manufactured by Clariant International Ltd.), Phos-chek-P/30 and Phos-chek-P/40 (Commercial names manufactured by Monsant Company), SUMISAFE-P (Commercial name manufactured by Sumitomo Chemical Co., Ltd.), TERRAJU-S10 and TERRAJU-S20 (Commercial names: manufactured by CHISSO CORPORATION).

Compounds having the above ammonium polyphosphate as a main component can also be used in the present invention. Such compounds are as follows the one wherein the said ammonium polyphosphate is coated or microencapsulated with thermosetting resin, the one wherein the surface of the said ammonium polyphosphate is coated with a melamine monomer or other nitrogen-containing organic compounds or the like, the one treated with a surfactant or a silicone compound, or the one hardly soluble obtained by adding the melamine or the like in the manufacturing process of ammonium polyphosphate.

Examples of commercial products of the compound having the above ammonium polyphosphate as a main component are Exolit-462 (Commercial name: manufactured by Clariant International Ltd.), SUMISAFE-PM (Commercial name: manufactured by Sumitomo Chemical Co., Ltd.), TERRAJU-C60, TERRAJU-C70, and TERRAJU-C80 (Commercial names manufactured by CHISSO CORPORATION).

The (poly)phosphate compound represented by the following general formula (3) used as the component (D) in the flame-retardant thermoplastic resin composition of the present invention is a salt of phosphoric acid and diamine or piperazine.

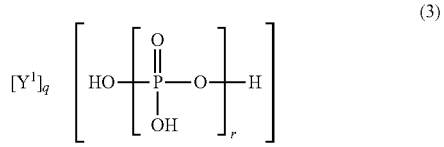

(3)

In the formula (3), r represents a number of 1~100, $Y^1$ is a diamine, containing $[R^1R^2N(CH_2)_m NR^3R^4]$, piperazine or a diamine containing a piperazine ring. $R^1$, $R^2$, $R^3$ and $R^4$ are each a hydrogen atom, or a straight chain or branched alkyl group having 1~5 carbon atoms. $R^1$, $R^2$, $R^3$ and $R^4$ may be identical or different, m is an integer of 1~10, g is a number, satisfying 0<q≤r+2.

Specific examples of diamine represented by $Y^1$ in the, above general formula (3) are N,N,N',N'-tetramethyldiaminomethane, ethylenediamine, N,N'-dimethylethylenediamine, N,N-diethylethylenediamine, N,N-dimethylethylenediamine, N,N-diethylethylenediamine, N,N,N',N'-tetramethylethylenediamine, N,N,N',N'-diethylethylenediamine, tetramethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, piperazine, trans-2,5-dimethylpiperazine, 1,4-bis(2-aminoethyl)piperazine and 1,4-bis(3-aminopropyl)piperazine. Commercial products can be used for all of the above examples of diamine.

An example of (poly) phosphate compound preferably used as the component (D) is a salt of phosphoric acid and piperazine. Specific examples of salt of phosphoric acid and piperazine are piperazine orthophosphate, piperazine pyrophosphate and piperazine polyphosphate. In the present invention, it is preferable to use piperazine polyphosphate among these in particular piperazine pyrophosphate which correspond to the compound expressed by the aforementioned general formula (3) wherein q is 1 and $Y^1$ is piperazine.

The salt of phosphoric acid and piperazine can be obtained by conventional methods. For example, piperazine pyrophosphate can be easily obtained as a precipitate having low-water solubility by carrying out a reaction between piperazine and pyrophdsphoric acid in water or methanol aqueous solution. However, piperazine polyphosphate may be a salt obtained from piperazine and polyphosphoric acid consisting of a mixture of orthophosphoric acid, pyrophosphoric acid, tripolyphosphoric acid, and other polyphosphoric acid. Thus, the composition of polyphosphoric acid as raw material is not limited in particular.

It is preferable that the blending amount of the above component (C) is 5~60 mass parts relative to 100 mass parts of the thermoplastic resin composition having components (A) and (B) as the main components, 10~3.5 mass parts is more preferable. On the other hand, it is preferable that the blending amount of the above component (D) is 10~90mass parts relative to 100 mass parts of the thermoplastic resin composition having components (A) and (B) as the main components, 15~50 mass parts is more preferable.

It is preferable that the total blending amount of the above components (C) and (D), which are flame retardant components, is 15~150 mass parts relative to 100 mass parts of the thermoplastic resin composition having components. (A) and (B) as main component, 25~85 mass parts is more preferable. If it is less than 15 mass parts, sufficiently flame-retardant effects might not be obtained. If more than 150 mass parts are added, the characteristics as a resin might decrease. In addition, it is preferable that the blending ratio (C)/(D) (mass standard) of the above components (C) and (D) is 20/80~50/50, and 30/70~50/50 is more preferable.

Next, the phosphoric acid ester compound as the component (E) of the flame-retardant thermoplastic composition of the present invention is explained.

The component (E) used in the, present invention is a component working as a compatibilizing agent a dispersing agent which improves the compatibility of thermoplastic polyurethane elastomer as the component (A) and ethylene copolymer as the component (B) used in the present invention and further improves compatibility and dispersibility, in the compositions, of not only the components (C) and (D) but also other added components.

The condensed phosphoric acid ester of the component (E) is represented by the following general formula (4).

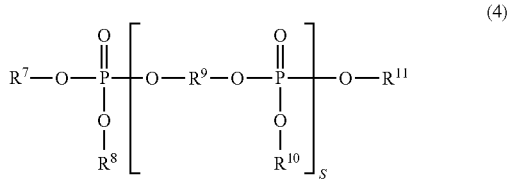

$R^7$, $R^8$, $R^{10}$ and $R^{11}$ in the formula (4) may be identical or different. They represent an alkyl group having 1-10 carbon atoms or an aromatic group represented by the following general formula (5). $R^9$ represents a bivalent aromatic group represented by the general formula (6) or (7), s represents a number of 0-30.

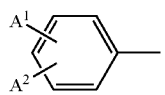

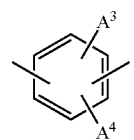

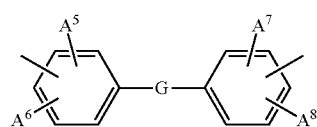

$A^1$ and $A^2$ in the formula (5) represent each a hydrogen atom, a hydroxy group or an alkyl group having 1-10 carbon atoms independently. $A^3$, $A^4$, $A^5$, $A^6$, $A^7$ and $A^8$ in the formulae (6) and (7) represent each a hydrogen atom, an alkyl group having 1-4 carbon atoms, a cycloalkyl group, an aryl group, an alkoxy group, nitro group, a halogen atom or a cyano group independently. G represents a direct bond, a bivalent sulfur atom, a sulfone group or an alkylidene group having 1-5 carbon atoms or an alkylene group.

Examples of alkyl groups having 1~10 carbon atoms, represented by $R^7$, $R^8$, $R^{10}$, $R^{11}$, $A^1$ and $A^2$ in the above general formulae (4)-(7) are methyl, ethyl, propyl, isopropyl, butyl, isobutyl, secondary butyl, tert-butyl, amyl, tert-amyl, hexyl, 2-ethylhexyl, n-octyl, nonyl and decyl. Examples of alkyl groups having 1~4 carbon atoms represented by $A^3$, $A^4$, $A^5$, $A^6$, $A^7$ and $A^8$ are methyl, ethyl, propyl, butyl, isobutyl, secondary butyl and tert-butyl. An example of cycloalkyl group includes cyclohexyl or the like. Examples of aryl groups are phenyl, cresyl, xylyl, 2,6-xylyl, 2,4,6-trimethylphenyl, butylphenyl and nonylphenyl or the like. Examples of alkoxy groups are methoxy, ethoxy, propoxy and butoxy or the like. Examples of halogen atoms are fluorin atom, chlorine atom and bromine atom or the like. Furthermore, examples of aromatic groups represented by the general formula (5) are phenyl, cresyl, xylyl, 2,6-xylyl, butylphenyl and nonylphenyl or the like. Examples of alkylidene groups having 1-5 carbon atoms represented by G are ethylidene and isopropylidene or the like. Examples of alkylene groups having 1-5 carbon atoms-aremethylene, ethylene, trimethylene and tetramethylene or the like.

In addition, s in the aforementioned general formula (4), which represents a phosphoric acid ester compound of the component (E), is 0-30, preferably 1-10.

Specific examples of a phosphoric acid ester compound used as the component (E) in the flame-retardant thermoplastic resin composition of the present invention are compounds of the following compounds Nos. 1-6. It is preferable to use the compound No. 2 in the present invention from the viewpoint that the effect of improving compatibility·dispersibility is high in particular.

Compound No. 1

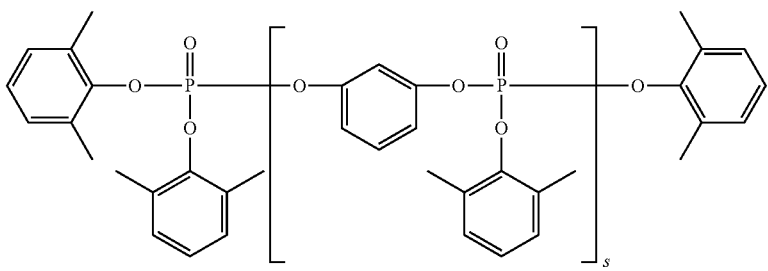

Compound No. 2

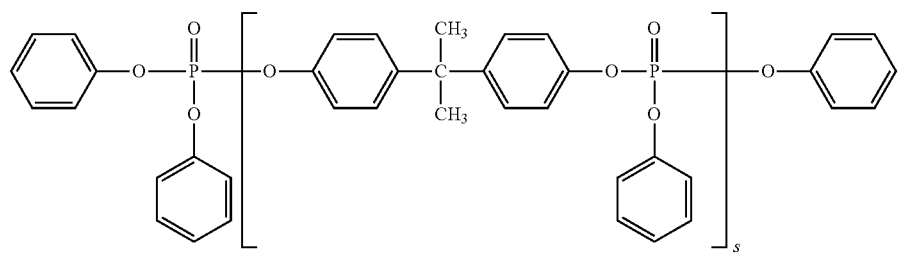

-continued

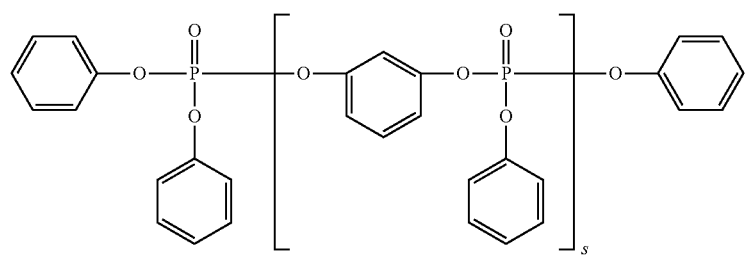

Compound No. 3

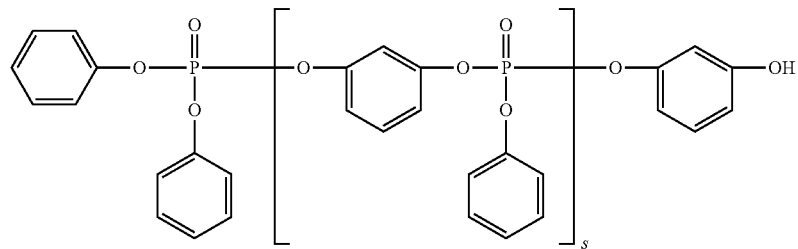

Compound No. 4

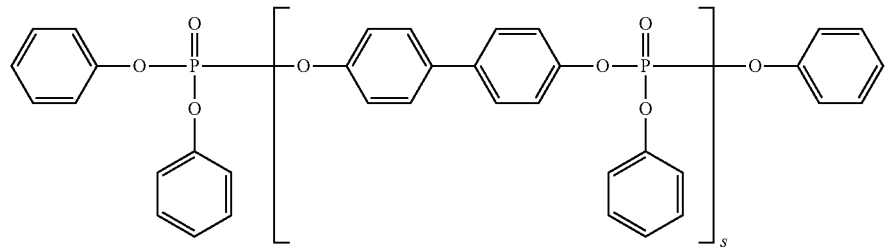

Compound No. 5

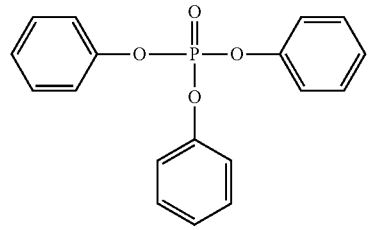

Compound No. 6

(s in the formula represents a number of 1~5

These phosphoric acid ester compounds may be used alone or two or more kinds of them may be used together. It is preferable in the flame-retardant thermoplastic resin composition of the present invention that the blending amount of the component (E) is 0.01~15mass parts relative to 100 mass parts of the thermoplastic resin composition having components (A) and (H) as the main components 0.1~10 mass parts is more preferable and 0.5~5 mass parts is optimal. If it is less than 0.01 mass parts, the effect of improving compatibility and dispersibility might not be obtained. If it is more than 15 mass parts, there might be an economical disadvantage.

It is preferable in the flame-retardant thermoplastic resin composition of the present invention that zinc oxide of a flame-retardant auxiliary agent is additionally blended as a component (F). The zinc oxide maybe surface-treated. In the present invention, commercial zinc oxide products can be used. Examples of commercial zinc oxide products are Zinc Oxide Grade 1 (manufactured by MITSUI MINING & SMELTING CO., LTD.), Partially Coated Type Zinc Oxide, (manufactured by MITSUI MINING & SMELTING CO., LTD.), NANOFINE 50 (ultrafine particle zinc oxide having average particle diameter of 0.02 μm manufactured by SAKAI CHEMICAL INDUSTRY CO., LTD.), NANOFINE K (ultrafine particle zinc oxide having average particle diameter of 0.02 μm coated with zinc silicate manufactured by SAKAI CHEMICAL INDUSTRY CO., LTD.).

It is preferable in the present invention that the blending amount of zinc oxide used as the component (F) is 0.01~10 mass parts relative to 100 mass parts of the thermoplastic resin composition having the components (A) and (B) as the main components. 0.1~5 mass parts is more preferable.

It is required in the flame-retardant thermoplastic resin composition of the present invention that the components (C), (D) and (E) are blended with the flame-retardant thermoplastic resin composition having the components (A) and (B) as the main components, and furthermore it is preferable to blend the component (F). The timing of blending the components. (C)~(F). with the thermoplastic resin composition is not limited in particular. For example, two or more kinds selected from the components (C)~(F) may be put together into one pack in advance to blend with the thermoplastic resin composition having the components (A) and (B) as the main components. Each component may be blended with the thermoplastic resin composition having the components (A) and (B) as the main components. Needless to say, the components (A)~(F) may be each blended to produce the flame-retardant thermoplastic resin composition.

When they are put together into one pack, each component may be crushed respectively to blend, or may be crushed after blended.

In addition, fluorinated anti-dripping agent may be blended with the flame-retardant thermoplastic resin composition of the present invention. However, when these fluorinated anti-dripping agents are blended, melt flow rate (MFR) of resin tends to decrease frequently, so care should be taken.

Specific examples of the above fluorinated anti-dripping agent are fluorinated resins such as polytetrafluoroethylene, polyvinylidene fluoride and polyhexafluoropropylene; perfluoroalkane sulfonic acid alkali metal salt compounds such as perfluoromethane sulfonic acid sodium salt, perfluoro-n-butane sulfonic acid potassium salt, perfluoro-t-butane sulfonic acid potassium salt, perfluorooctane sulfonic acid sodium salt and perfluoro 2-ethylhexane sulfonic acid calcium, salt; or perfluoroalkane sulfonic acid alkaline earth metal salt etc.. These may be used alone, or two or more kinds of them can be used by mixture. Similarly, silicone rubbers can be blended as other anti-dripping agents.

Silicone oil may be blended with the flame-retardant thermoplastic resin composition of the present invention in order to prevent secondary aggregation when blended and to improve water resistance. It is preferable to use the silicone oil having methylpolysiloxane structure.

The silicone oil having methylpolysiloxane structure may consist of dimethylpolysiloxane structure alone, a structure containing both dimethylpolysiloxane structure and methylhydrogenpolysiloxane structure, or methylhydrogenpolysiloxane structure alone. The above silicone oils may be epoxy-modified, carboxyl-modified, carbinol-modified and/or amino-modified.

A specific example of the above silicone oils consisting of 100% methylhydrogen structure is KF-99 (manufactured by Shin-Etsu Chemical Co., Ltd.). Specific examples of silicone oil partially consisting of methylhydrogen structure are HMS-151 (manufactured by Gelest Inc.), HMS-071 (manufactured by Gelest Inc.), HMS-301 (manufactured by Gelest Inc.) and DMS-H21 (manufactured by Gelest Inc.). Examples of epoxy-modified products, are X-22-2000 (manufactured by Shin-Etsu Chemical Co., Ltd. ) and KF-102 (manufactured by Shin-Etsu Chemical Co., Ltd. ). An example of a carboxyl-modified product is X-22-2701E (manufactured by Shin-Etsu Chemical Co., Ltd.). An example of a carbinol-modified product is X-22-4015 (manufactured by Shin-Etsu Chemical Co., Ltd.). An example of amino-modified product is KF-393 (manufactured by Shin-Etsu Chemical Co., Ltd.)

Synthetic resins other than the components (A) and (B) as a resin component may be blended in the flame-retardant thermoplastic resin composition of the present invention. Such synthetic resins include thermoplastic resins, and blends thereof, thermosetting resins and elastomers. Examples of the thermoplastic resins may be α-olefin polymers such as polypropylene, polybutene, poly-3-methylpentene and copolymers thereof; halogen-containing resins such as polyvinyl chloride, polyvinylidene chloride, chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, vinyl chloride-vinylidene chloride-vinyl acetate three-dimensional copolymer, vinyl chloride-acrylic acid, ester copolymer, vinyl chloride-maleic acid ester copolymer and vinyl chloride-cyclohexylmaleimide copolymer; petroleum resin, coumarone resin, polystyrene, polyvinyl acetate, acrylic resin, copolymer of styrene and/or α-methyl styrene with other monomers (for example, maleic anhydride, phenyl maleimide, methacrylic acid methyl, butadiene and acrylic nitrile or the like), (for example, AS resin, ABS resin, MBS resin and thermal resistant ABS resin or the like); polymethyl methacrylate; polyvinyl alcohol; polyvinyl formal; polyvinyl butyral; straight chain polyesters such as polyethylene terephthalate and polybutylene terephthalate; polyphenylene oxide; polyamides such as polycapro lactam and polyhexamethylene adipamide; polycarbonate, polycarbonate/ABS resin, branched, polycarbonate, polyacetal, polyphenylene sulfide, polyurethane and cellulose resin. Examples of thermosetting resins may be phenol resin, urea resin, melamine resin, epoxy resin and unsaturated polyester resin. Furthermore, examples of elastomers may be isoprene rubber, butadiene rubber, acrylonitrile-butadiene copolymerization rubber and styrene-butadiene copolymerization rubber.

It is preferable that lubricants are further blended with the flame-retardant thermoplastic resin composition of the present invention if necessary.

Examples of these lubricants are pure hydrocarbon lubricants such as liquid paraffin, natural paraffin, microwax, synthetic paraffin and low-molecular weight polyethylene; halogenated hydrocarbon lubricant; fatty acid lubricants such as higher fatty acid, and oxy fatty acid; fatty acid amide lubricants such as fatty acid amide and bis fatty acid amide ester lubricants such as lower alcohol ester of fatty acid, polyalcohol ester of fatty acid like glyceride, polyglycol ester of fatty acid and fatty alcohol ester of fatty acid (ester wax); metal soap, fatty alcohol, polyalcohol, polyglycol, polyglycerol, partial ester made of fatty acid and polyalcohol, partial ester lubricant made of fatty acid and polyglycol or polyglycerol, (meth) acrylic acid ester copolymer and silicone oil.

It is preferable that the blending amount of lubricant is 0.01~5 mass parts relative to 100 mass parts of the thermoplastic resin composition having the components (A) and (B) as the main components. 0.1~1 mass parts is more preferable.

It is preferable that the flame-retardant thermoplastic resin composition of the present invention is stabilized by adding phenol antioxidant, phosphoric antioxidant, thioether antioxidant, ultraviolet absorber and hindered amine light stabilizer or the like, if necessary.

Examples of the aforementioned phenol antioxidant are 2,6-di-tert-butyl-p-cresol, 2,6-diphenyl-4-octadesiloxyphenyl, distearyl(3,5-di-tert-butyl-4-hydroxybenzyl)phosphonate, 1,6-hexamethylenebis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis (6-tert-butyl-m-cresol):, 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl) butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzen, 2-tert-butyl-4-methyl-6-(2-acryloyoxy-3-tert-butyl-5-methylbenzyl) phenol, stearyl(3,5-di-tert-butyl-4-hydroxyphenyl) propionate, tetrakis[3-(3,5-di-tert-butyl-4-hydroxyphenyl), methylpropionate]methane, thiodiethyleneglycol-bis [(3,5-di-tert-butyl-4-hydroxyphenyl)propionate], 1,6-hexamethylene-bis[(3,5-di-tert-butyl-4-hydroxyphenyl) propionate], bis [3,3-bis(4-hydroxy-3-tert-butylphenyl)butylicacid] glycolester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl) propionyloxyethyl]

isocyanurate, 3,9-bis[1,1-dimethyl-2-{(3-tert-butyl-4-hydroxy-5-methylphenyl)propionyloxy}ethyl]-2,4,8,10-tetraoxaspiro [5,5]undecane, and triethyleneglycol-bis[(3-tert-butyl-4-hydroxy-5-methylphenyl)propionate] or the like. It is preferable that the amount used is 0.001~10 mass parts relative to 100 mass parts of the thermoplastic resin composition having the components (A) and (B) as the main components. 0.05~5 mass parts is more preferable.

Examples of the aforementioned phosphoric antioxidant are trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl) monophenyl phosphite, di(tridecyl)pentaerythritol diphosphite, di(nonylphenyl) pentaerythritol diphosphite, bis (2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidenebis(2-tert-butyl-5-methyl phenol) diphosphite, hexa(tridecyl)-1,1,3-tris(2-methyl-4-hydroxy-5-tert-butylphenyl) butane triphosphite, tetrakis(2,4-ditert-butylphenyl)biphenylene diphosphonite, 9,10-dihydro-9-oxa-10-phosphaphenanthrene-10-oxide, 2,2'-methylenebis (4,6-tert-butylphenyl)-2-ethylhexyl phosphite, 2,2'-methylenebis(4,6-tert-butylphenyl)-octadecylphosphite, 2,2'-ethylidenebis(4,6-di-tert-butylphenyl) fluorophosphite and phosphites of tris(2-[(2,4,8,10-tetrakis-tert-butyldibenzo[d,f][1,3,2] dioxaphosphepine-6-yl)oxy]ethyl) amine, 2-ethyl-2-butylpropyleneglycol and 2,4,6-tri-tert-butylphenol. It is preferable to use 0.001~10 mass parts of them relative to 100 mass parts of the thermoplastic resin composition having the components (A) and (B) as the main components. 0.05~5 mass parts of them is more preferable.

Examples of the above thioether antioxidants are dialkyl thiodipropionates such as dilauryl thiodipropionate, dimylistyl thiodipropionate and distearyl thiodipropionate, and pentaerythritol tetra(β-alkyl mercapto propionic acid esters). It is preferable to use 0.001~10 mass parts of them relative to 100 mass parts of the thermoplastic resin composition having the components (A) and (B) as the main components. 0.05~5 mass parts of them is more preferable.

Examples of the aforementioned ultraviolet absorber are 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphehyl) benzotriazoles such as 2-(2'-hydroxy-5'-methylphenyl) benzotriazole, 2-(2'-hydroxy-3',5'-ditert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis (4-tert-octyl-6-(benzotriazolyl)phenol) and 2-(2'-hydroxy-3'-tert-butyl-5'-carboxyphenyl) benzotriazole; benzoates such as phenyl salicylate, resorcinolmonobenzoate, 2,4-ditert-butylphenyl-3,5-ditert-butyl-4-hydroxybenzoate, 2,4-di-tert-amylphenyl-3,5-di-tert-butyl-4-hydrbxybenzoate and hexadecyl-3,5-ditert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β, β-diphenylacrylate and methyl-2-cyano-3-methyl-3-(p-methoxyphenyl)acrylate; triaryl triazines such as 2-(2-hydroxy-4-octoxyphenyl)-4,6-bis(2,4 ditert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis (2,4-di-tert-butylphenyl)-s-triazine. It is preferable to use 0.001~30 mass parts of them relative to 100 mass parts of the thermoplastic resin composition having the components (A) and (B) as the main components. 0.05~10 mass parts of them is more preferable.

Examples of the aforementioned hindered amine light stabilizer are hindered amine compounds such as 2,2,6,6-tetramethyl-4-piperidyl, stearate, 1,2,2,6,6-pentamethyl-4-piperidyl stearate, 2,2,6,6-tetramethyl-4-piperidyl benzoate, bis (2,2,6,6-tetramethyl-4-piperidyl) sebacate, bis(1,2,2,6,6-pentamethyl-4-piperidyl) sebacate, bis(1-octoxy-2,2,6,6-tetramethyl-4-piperidyl) sebacate, tetrakis(2,2,6,6-tetramethyl-4-piperidyl) -1,2,3,4-butane-tetracarboxylate, tetrakis(1,2,2,6,6-pentamethyl-4-piperidyl)-1,2,3,4-butane-tetracarboxylate, bis(2,2,6,6-tetramethyl-4-piperidyl) di(tridecyl)-1,2,3,4-butane-tetracarboxylate, bis(1,2, 2,6,6-pentamethyl-4-piperidyl) di(tridecyl)-1,2,3,4-butane-tetracarboxylate, bis(1,2,2,4,4-pentamethyl-4-piperidyl)-2-butyl-2-(3,5-ditert-butyl-4-hydroxybenzyl)malonate, 1-(2-hydroxyethyl)-2,2,6,6-tetramethyl-4-piperidynol/diethyl succinate condensation polymers, 1,6-bis(2,2,6,6-tetramethyl-4-piperidylamino)hexane/2,4-dichloro-6-morpholino-s-triazine condensation polymers, 1,6-bis(2,2,6,6-tetramethyl-4-piperidylamino) hexane/2,4-dichloro-6-tert-octylamino-s-triazine condensation polymers, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl] aminoundecane and 1,6,11-tris[2,4-bis(N-butyl-N-(1,2,2,6,6-pentamethyl-4-piperidyl)amino)-s-triazine-6-yl] aminoundecane. It is preferable to use 0.001~30 mass parts of them relative to 100 mass parts of the thermoplastic resin composition having the. components (A) and (B) as the main components. 0.05~10 mass parts of them is more preferable.

Nucleating agents such as p-tert-butyl aluminum benzoate, aromatic phosphoric acid ester metallic salt and dibenzylidene sorbitol; antistatic agent, metallic, soap, hydrotalcite, triazine ring-containing compound, metallic hydroxide, inorganic phosphorus flame, retardant, silicone flame retardant, other inorganic flame-retardant auxiliary agents, other organic flame retardants, filler, pigment and foaming agent may be added to the flame-retardant thermoplastic resin composition of the present invention, if necessary, within the range where the effect of the present invention, is not damaged.

Examples of the above, triazine ring-containing compound, are melamine, ammeline, benzoguanamine, acetoguanamine, phthalodiguanamine, melamine cyanurate, melamine pyrophosphate, butylenediguanamine, nor-bornenediguanamine, methylenediguanamine, ethylenedimelamine, trimethylenedimelamine, tetramethylenedimelamine, hexamethylenedimelamine and 1,3-hexylenedimelamine etc.

Examples of the above metal hydroxide are magnesium hydroxide, aluminium hydroxide, calcium hydroxide barium hydroxide, zinc hydroxide and Kisuma 5A (commercial name of magnesium hydroxide manufactured by Kyowa Chemical Industry Co., Ltd).

Examples of the above other inorganic flame-retardant auxiliary agent are inorganic compounds such as titanium oxide, aluminium oxide, magnesium oxide and hydrotalcite, and their surface-treated products. Various types of commercial products such as TIPAQUE R-680 (titanium oxide manufactured by ISHIHARA SANGYO, LTD.), Kyowa MAG 150 (magnesium oxide manufactured by Kyowa Chemical Industry Co., Ltd), DHT-4A (hydrotalcite: manufactured by Kyowa Chemical Industry Co., Ltd) and Alkamiser 4 (zinc-modified hydrotalcite manufactured by Kyowa Chemical Industry Co., Ltd) can be used.

The example of the above other organic flame-retardant auxiliary agents is pentaerithritol. The flame-retardant thermoplastic resin composition of the present invention can further, contain additives which are usually used for synthetic resin, such as cross linking agent, antistatic agent, tarnish inhibitor, plate-out inhibitor, surface treatment agent, plasticizer, lubricant, flame retardant, fluorescent agent, mildew agent, disinfectant, foaming agent, metal deactivator, mold-releasing agent, pigment, processing material, antioxidant and light stabilizer, within the range where the effect of the present invention is not damaged.

The flame-retardant synthetic resin molded article can be obtained by molding the flame-retardant thermoplastic resin composition of the present invention by conventional methods. The method of molding is not limited in particular. Examples of molding methods are extrusion process molding, calender process molding, injection molding, roll molding, compression molding and blow molding etc.. Molded products having various forms such as resin board, sheet, film and variant articles can be manufactured by these molding methods.

Also, the flame-retardant thermoplastic resin composition and its molded article of the present invention can be widely used for the industrial fields such as electric electronic·communication, Agriculture, Forestry and Fisheries, mining, construction, food, fiber, clothes, medical, care, coal, petroleum, rubber, leather, automobile, precision instrument, lumber, building material, civil engineering, furniture, printing and musical instrument. More specific examples of use are office automation instruments such as a printer, a personal computer, a word processor, a keyboard, a personal digital assistant equipment, a telephone equipment, a copy machine, a fax machine, an electronic cash register, a personal electronic calculator, an electronic organizer, a card, a holder and a writing material; electric household appliances and electrical equipments such as a laundry machine, a refrigerator, a vacuum cleaner, a microwave, a lighting equipment, a game machine, an iron and a kotatsu; audio video equipments such as a television, a video tape recorder, a video camera, a radio cassette player, a tape recorder, a mini disc, a CD player, a speaker and a liquid crystal display; electric·electrical parts and communication devices such as a connector, a relay, a condenser, a switch, a printed circuit board, a coil bobbin, a semiconductor sealing material, a LED sealing material, an electric wire, a cable, a transformer, a deflection yoke, a distribution switchboard and a clock.

The flame-retardant thermoplastic resin composition and its molded article of the present invention can further be widely used for automobile, vehicle, ship, airplane, building, housing and materials for building or civil engineering such as seat (stuffing, outer material and the like), belt, ceiling covering, convertible top, armrest, door trim, rear package tray, mat, sun visor, wheel cover, mattress cover, air-bag, insulating, material, strap, strap belt, wire coating material, electrical insulating material, paint, coating material, top layer material, floor material, corner wall material, carpet, wallpaper, wall covering material, facing material, interior material, roof material, deck material, wall material/ pillar material, bottom board, fence material, framing and molding, window and door shape materials, shingle board, siding, terrace, balcony, soundproof board, thermal insulating board and window material; living goods and sporting goods such as clothing material/curtain, sheets, plywood, synthetic fiber board, rug, doormat, tarpaulin, bucket, hose, container, glasses, bag, case, snow goggle, ski, racket, tent and musical instrument.

Among these uses, the uses for non-halogen electric wire, electrical insulating material and cable or the like are preferable in particular. Since halogen is not used, the disposal is carried out more easily than usual, which is an advantage.

The invention will now be explained in detail referring to examples, but the invention should not be limited by these explanations. All of the compositions shown in Table 1 are based on mass parts.

EXAMPLES 1~2 AND COMPARATIVE EXAMPLES 1~2

0.1 mass parts of calcium stearate (lubricant), 0.1 mass parts of tetrakis [3-(3,5-ditert-butyl-4-hydroxyphenyl) methyl propionate] methane (phenol antioxidant), 0.1 mass parts of tris (2,4-di-tert-butylphenyl) phosphite (phosphorus antioxidant), 0.3 mass parts of glycerin monostearate (lubricant)(S-100: manufactured by Riken Vitamin Co., Ltd.) and silicone oil (lubricant) (KF-96: manufactured by Shin-Etsu Chemical Co. LTD.) were added to a mixture of 20 mass parts of thermoplastic polyurethane elastomer (RESAMINE P-1078F; manufactured by Dainichiseika Color & Chemical Mfg. Co., Ltd,) and 40 mass parts of ethylene-vinyl acetate copolymer (Ultrathene 635: manufactured by Tosoh Corporation), to obtain thermoplastic. resin composition. The obtained, thermoplastic resin composition was mixed with the component described in the following Table 1 to manufacture pellet extruded under the following processing conditions. The pellet was extrusion-molded under the conditions described bellow, then it was injection molded at 190° C. to obtain 1.6 mm×12.7 mm×127 mm of test pieces for flame-retardant test and test pieces for an electron microscope (SEM) to evaluate compatibility were obtained.

Test pieces were obtained in the same way, using 40 mass parts of low-density polyethylene. (PES-120manufactured by Nippon Unicar Company Limited) instead of ethylene-vinyl acetate copolymer used when the above test pieces were prepared.

Regarding each test piece obtained, tests of workability, tests of flame retardancy and tests of compatibility were carried out for evaluation under the following conditions. The results are shown in Table 1.

<Workability Test Condition>

Extrusion machine; LABO PLASTOMILL extrusion machine (manufactured by Toyo Seiki Seisaku-sho, Ltd.)

Temperature 190° C.
Screw: conical (two axes)
Rotation number 7.5 rpm
Dice 1 mm×19 mm
Feed 70~85 g/min <Workability Test Evaluations>

The evaluation of workability was carried out by the following criteria wherein the surface of the strand was identified visually when extrusion-processed under the following condition.

○: The surface of the strand is smooth and excellent in flatness and smoothness.

Δ: The surface of the strand is slightly irregular.

×: The surface of the strand is irregular, which is neither smooth nor flat.

<Flame Retardancy UL-94V Test Method>

After the test piece of 127 mm long×12.7 mm wide×1.6 mm thick was hold vertically and its bottom end was contacted with fire of burner for 10 seconds, the burner was removed to measure the time until the fire of the test piece goes out. As soon as the fire went out, the second contact of fire was carried out for 10 seconds to measure the time until the fire goes out in the same way as the first time. Furthermore, whether the cotton of the lower part of the test piece is fired or not with dropping live charcoal was evaluated simultaneously.

Based on the first and second burning time and whether the cotton was fired or not, the burning degree was ranked according to UL-9.4V standard. V-0 is ranked as the top level of burning. As the number increases like V-0, V-1 and V-2, the flame retardancy gets lower. NR was the one that did not correspond to any of V-0~V-2.

<Compatibility Test>

Cross section surfaces of test pieces were identified using an electron microscope (JSM-6390LA: manufactured by JEOL Ltd.). Cross sectional pictures are shown in FIGS. 1-4.

Compatibility was estimated from the pictures according to the following standards.

○: Compatible compatibility and dispersibility are excellent.
Δ: Partially somewhat non-compatible compatibility and dispersibility are somewhat poor.
×: Non-compatible compatibility and dispersibility are poor.

The components (C) and (D) described in Table 1 were manufactured by the following methods.

[Manufacturing Example 1]
Component (C): melamine pyrophosphate
Manufactured by carrying out a reaction of pyrophosphoric acid and melamine at the ratio of 1:1.

[Manufacturing Example 2]
Component (D): piperazine pyrophosphate
Manufactured by carrying out a reaction of pyrophosphoric acid and piperazine at the ratio of 1:1.

The following compound No. 2 mentioned before was used as the phosphoric acid ester compound of the component (E) described in Table 1.

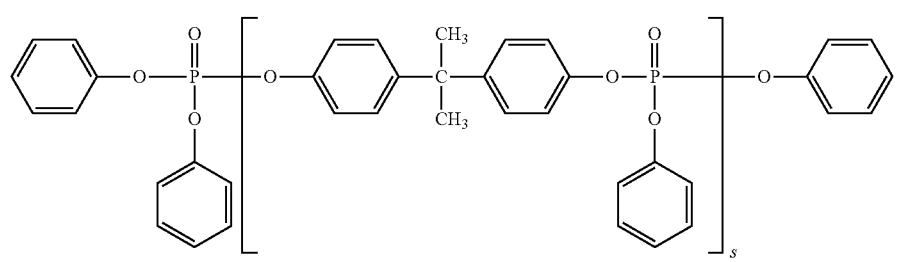

Compound No. 2

$S = 1.0~1.1$

TABLE 1

Figure 2:
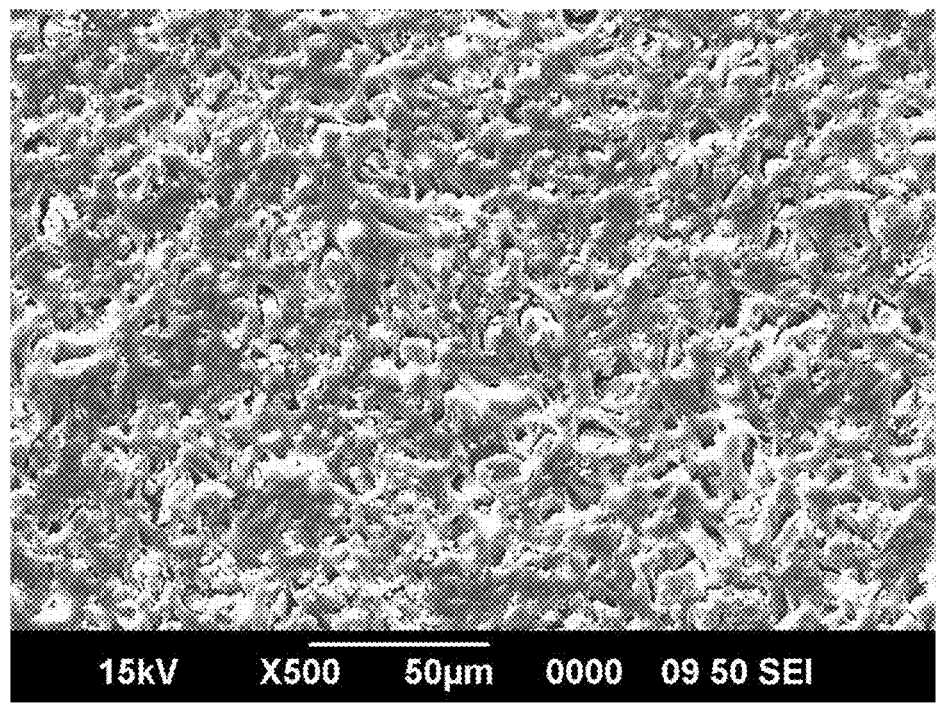
[FIG. 2]
A corresponding drawing to SEM picture obtained in the compatibility test, in Comparative Example 1.
Figure 3:
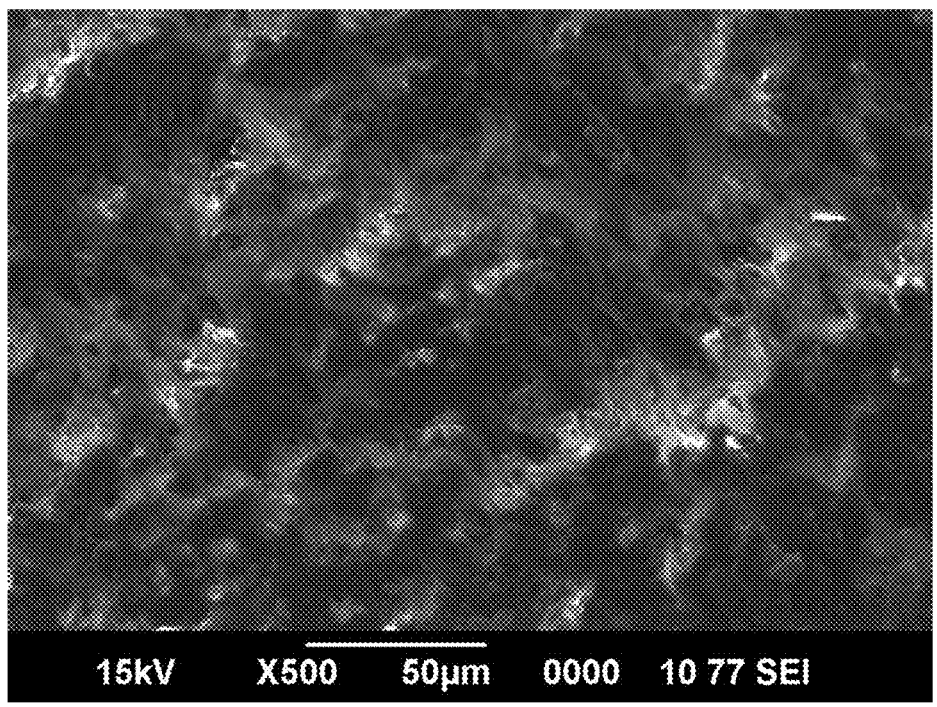
[FIG. 3]
A corresponding drawing to SEM picture obtained in the compatibility test, in Example 2.
Figure 4:
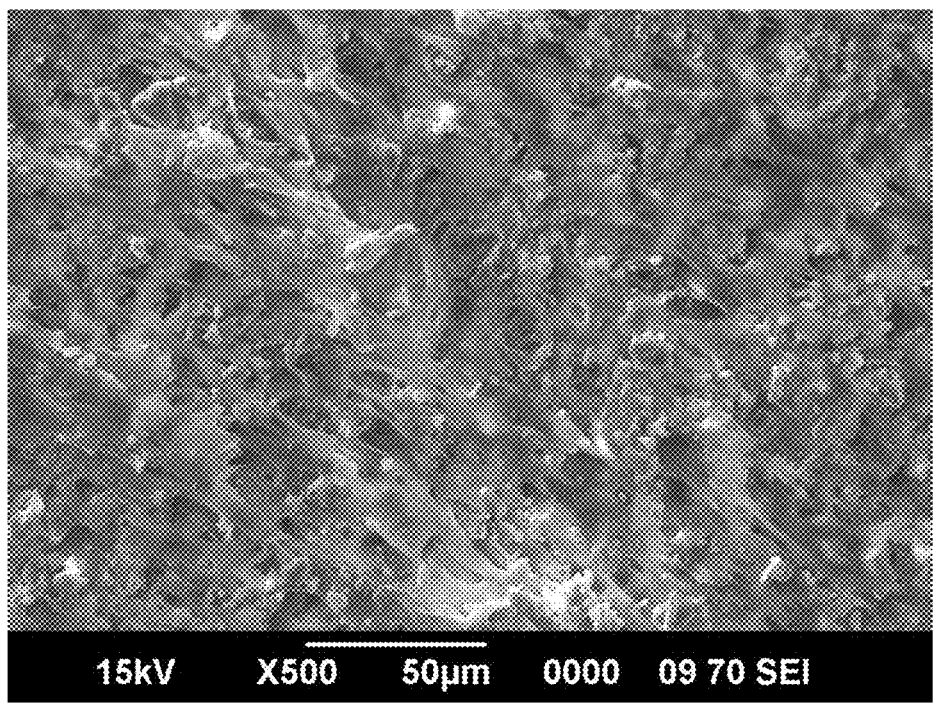
[FIG. 4]
A corresponding drawing to SEM picture obtained in the compatibility test, in Comparative Example 2.

|  | Example | | Comparative Example | |
|---|---|---|---|---|
| Composition | 1 | 2 | 1 | 2 |
| Component (A) Thermoplastic polyurethane elastomer | 20 | 20 | 20 | 20 |
| Component (B) Ethylene-vinyl acetate copolymer | 40 |  | 40 |  |
| Low density polyethylene |  | 40 |  | 40 |
| Component (C) Melamine pyrophosphate | 15.2 | 15.2 | 15.2 | 15.2 |
| Component (D) Piperazine pyrophosphate | 22.8 | 22.8 | 22.8 | 22.8 |
| Component (E) Compound-2 | 2.0 | 2.0 |  |  |
| Component (F) Zinc oxide | 2.0 | 2.0 | 2.0 | 2.0 |
| Glycerine monostearate | 0.3 | 0.3 | 0.3 | 0.3 |
| Silicone oil | 0.5 | 0.5 | 0.5 | 0.5 |
| Calcium stearate | 0.1 | 0.1 | 0.1 | 0.1 |
| Phenol antioxidant | 0.1 | 0.1 | 0.1 | 0.1 |
| Phosphorus antioxidant | 0.1 | 0.1 | 0.1 | 0.1 |
| Workability test result | ○ | ○ | X | X |
| Flame retardancy UL-94V (1.6 mm) | V-0 | V-0 | V-0 | V-0 |
| Compatibility test evaluation | ○ | ○ | X | X |
| picture | FIG. 1 | FIG. 3 | FIG. 2 | FIG. 4 |

Examples 1 and 2 of the present invention achieved the top rank of V-0 in the UL-94V test and also were identified to have excellent workability, compatibility, and dispersibility. On the contrary, though Comparative examples 1 and 2 achieved the top rank of V-0 in the UL-94V test, it was identified that workability, compatibility and dispersibility were poor.

Industrial Applicability

Although the flame-retardant thermoplastic resin composition of the present invention is comprised of a thermoplastic resin composition, having thermoplastic polyurethane elastomer, excellent in mechanical strength and wear resistance, and ethylene copolymer as the main components, it has excellent compatibility, dispersibility, workability and flame retardancy. Therefore, it is suitable for a coating material for electric wires or cables in particular. In addition, since halogen is not used, it has excellent environmental qualities, which means that it is considerably valuable industrially.

What is claimed is:

1. A flame-retardant thermoplastic resin composition comprising: flame retardant components (C) and (D) and compatibilizing dispersion agent (E), blended with a thermoplastic resin composition having a thermoplastic polyurethane elastomer of the Component (A) and an ethylene polymer and/or an ethylene copolymer of the Component (B) as the main components, wherein the amount of Components (C), (D) and (E) relative to 100 mass parts of the thermoplastic resin composition having Components (A) and (B) are 5-60 mass parts of Component (C), 10-90 mass parts of Component (D) and 0.5 to less than 5 mass parts of component (E) and
wherein the blending amount of the above component (A) is 5-80 mass % relative to 100 mass % of the total amount of the components (A) and (B);

Component (C): a (poly) phosphate compound represented by the following formula (1):

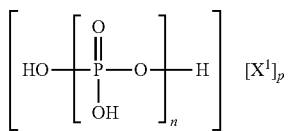
(1)

wherein n in the formula (1) represents a number of 1-100, $X^1$ is an ammonia or a triazine group represented by the following formula (2), p is a number satisfying a relation of $0<p\leq n+2$ ;

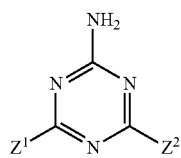
(2)

wherein $Z^1$ and $Z^2$ in the formula (2) may be identical or different and are groups selected from groups of: a —$NR^5R^6$ group, wherein $R^5$ and $R^6$ are each independently a hydrogen atom, a straight chain or branched alkyl group having 1~6 carbon atoms, or a methylol group; a hydroxyl group; a mercapto group; a straight chain or branched alkyl group having 1~10 carbon atoms; a straight chain or branched alkoxy group having 1~10 carbon atoms; a phenyl group; and a vinyl group;

Component (D): a (poly) phosphate compound represented by the following formula (3):

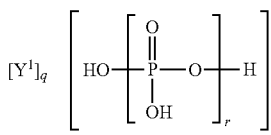
(3)

wherein r in the formula (3) represents a number of 1~100, $Y^1$ is a diamine containing the group $R^1R^2N(CH_2)_m NR^3R^4$, a piperazine group or a diamine group containing piperazine ring; $R^1$, $R^2$, $R^3$ and $R^4$ are each independently a hydrogen atom, or a straight chain or branched alkyl group having 1~5 carbon atoms; m is an integer of 1~10, and q is a number satisfying a relation of $0<q\leq r+2$;

Component (E): a phosphoric acid ester compound represented by the following formula (4).

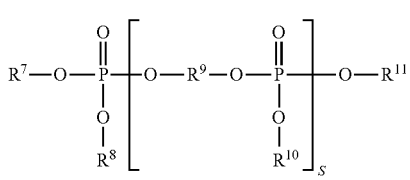
(4)

wherein $R^7$, $R^8$, $R^{10}$ and $R^{11}$ in the formula (4) may be identical or different and represent an alkyl group having 1~10 carbon atoms, or an aromatic group represented by the following general formula (5); $R^9$ represents a bivalent aromatic group represented by the following formula (6) or (7), s is a number of 0-30;

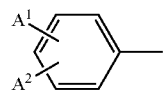
(5)

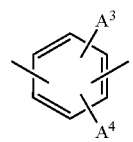
(6)

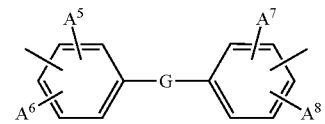
(7)

wherein $A^1$ and $A^2$ in the above formulae each independently represent a hydrogen atom, a hydroxy group or an alkyl group having 1-10 carbon atoms; $A^3$, $A^4$, $A^5$, $A^6$, $A^7$ and $A^8$ each independently represent a hydrogen atom, an alkyl group having 1~4 carbon atoms, a cycloalkyl group, an aryl group, an alkoxy group, a nitro group, a halogen atom or a cyano group; G represents a direct bond, a bivalent sulfur atom, or a sulfonic group, an alkylidene group having 1~5 carbon atoms or an alkylene group.

2. The flame-retardant thermoplastic resin composition described in claim 1 further comprised of zinc oxide as the component (F).

3. The flame-retardant thermoplastic resin composition described in claim 1, wherein Component (C) is a melamine pyrophosphate which is expressed by the above formula (1) wherein n is 2, p is 2, and $X^1$ is melamine wherein $Z^1$ and $Z^2$ in the above formula (2) are —$NH_2$.

4. The flame-retardant thermoplastic resin composition described in claim 1, wherein Component (D) is a piperazine polyphosphate which is expressed by the above formula (3) wherein q is 1 and $Y^1$ is a piperazine group.

5. The flame-retardant thermoplastic resin composition described in claim 4, wherein Component (D) is piperazine pyrophosphate.

6. The flame-retardant thermoplastic resin composition described in claim 1, wherein component (B) is an ethylene-vinyl acetate copolymer.

7. An electric wire or cable comprising the flame-retardant thermoplastic resin composition described in claim 1.

8. The flame-retardant thermoplastic resin composition of claim 1 wherein the amount of Components (C), (D) and (E) relative to 100 mass parts of the thermoplastic resin composition having Components (A) and (B) are 10-35 mass parts of Component (C), 15-50 mass parts of Component (D) and 0.1-10 mass parts of component (E).

* * * * *